United States Patent [19]

Castrup

[11] Patent Number: 4,586,731
[45] Date of Patent: May 6, 1986

[54] TUBE FITTING WITH FERRULE

[75] Inventor: Rolf Castrup, Versmold-Oesterweg, Fed. Rep. of Germany

[73] Assignee: Ermeto Armaturen GmbH, Bielefeld, Fed. Rep. of Germany

[21] Appl. No.: 652,779

[22] Filed: Sep. 20, 1984

[30] Foreign Application Priority Data

Sep. 20, 1983 [DE] Fed. Rep. of Germany ....... 3333866

[51] Int. Cl.$^4$ ............................................. F16L 19/08
[52] U.S. Cl. ...................................... 285/4; 285/341; 285/382.7
[58] Field of Search ................... 285/341, 382.7, 3, 4, 285/DIG. 17

[56] References Cited

U.S. PATENT DOCUMENTS

| | | | |
|---|---|---|---|
| 2,171,217 | 8/1939 | Kreidel | 285/DIG. 17 X |
| 2,553,981 | 5/1951 | Richardson | 285/382.7 X |
| 2,641,489 | 6/1953 | Hedberg, Jr. | 285/3 |
| 2,935,339 | 5/1960 | Frederick | 285/4 |
| 3,120,969 | 2/1964 | Schmohl | 285/341 |
| 3,278,206 | 10/1966 | Woodling | 285/382.7 X |
| 3,402,949 | 9/1968 | Mahoney | 285/382.7 X |
| 3,736,008 | 5/1973 | Crawford | 285/382.7 X |
| 3,893,716 | 7/1975 | Moreiras et al. | 285/3 |
| 4,022,497 | 5/1977 | Kotsakis | 285/341 X |
| 4,304,422 | 12/1981 | Schwarz | 285/4 |

FOREIGN PATENT DOCUMENTS

| | | | |
|---|---|---|---|
| 1296901 | 7/1971 | Fed. Rep. of Germany. | |
| 2394736 | 2/1979 | France | 285/341 |

Primary Examiner—Thomas F. Callaghan
Attorney, Agent, or Firm—Joseph B. Balazs

[57] ABSTRACT

A tube fitting with a one-piece ferrule adapted to shear during assembly into two cutting rings for serial setting of the cutting edges thereof into the tube surface. The rear cutting ring is deformed and guided by the previously set front cutting ring at a preferred cutting angle. Engagement of abutment surfaces on the cutting rings determines a final position for the rings and provides a signal to the assembler that the joint is completed. The undeformed ferrule includes a conical front cutting ring having a cutting edge of one diameter, a cylindrical rear ring having a cutting edge of larger diameter, an external annular groove and an enlarged bore therebelow which in part forms the rear cutting ring and controls deformation thereof. The annular groove is placed to define a shear zone between the cutting rings and the shoulders of the groove are the abutment surfaces for determining completed joint position.

4 Claims, 5 Drawing Figures

TUBE FITTING WITH FERRULE

BACKGROUND OF THE INVENTION

This invention relates to fittings with a ferrule for use in connecting tubes, said ferrule having a forwardly converging conical front part and an inner and outer surface, said inner surface having two annular cutting edges of different diameters. The ferrule or sealing ring is inserted between a connecting piece or body member having an inner conical surface, and a pressure member or nut whereby when the pressure member is tightened, the ferrule is axially moved along the stationary tube end with its cutting edges cutting into the outer tube wall by pushing up wall material of the tube. The ferrule is initially in one piece, but is sheared into two cutting rings during tightening to provide serial ring engagement and a signal to the operator that the fitting assembly is completed.

A tube joint or tube fitting with a ferrule comprising two cutting edges one behind the other in the direction of motion, defining bores with different diameters is disclosed in German Pat. No. 1,296,901. The back face of the rear cutting edge has a conical transition into the cylindrical inner surface of the rearward part of the ferrule deformably joining the tube wall at the last phase of assembly, whereby no exact limiting can be felt by the assembler to indicate that installation is completed. Thereby the danger arises of stripping the thread of the fitting during the operation.

Another known tube joint or tube fitting is disclosed in U.S. Pat. No. 3,120,969 comprising a ferrule having an outer and an inner conical front part, with two cutting edges, the rear cutting edge being a limiting edge with its front side vertically directed to the surface of the pipe or tube. The limiting edge is followed by an inner surface of cylindrical shape changing into a convex curved surface at the end of the ferrule. With this ferrule the limiting edge effects a progressive increase of the cutting resistance when the connection is completed, so that the assembler cannot determine the end of operation clearly enough by the applied torque.

It is well known that the reason for many defects of fittings is not due to the construction but to the installation work or assembly operation. In many cases the assembler uses too much energy thereby stripping the thread. Also, when using thin walled tubes, the tube to be connected may reduce its profile at the point of connection thereby tilting the end of the tube and causing leakages.

Another known tube fitting is disclosed in U.S. Pat. No. 3,893,716 in which a two piece ferrule is sequentially set into a tube surface as the ferrule and tube are moved axially. This form of fitting includes a slotted rear ring having a shear section thereon and requires preassembly of the rings.

SUMMARY OF THE INVENTION

It is an object of the present invention to provide a fitting with a ferrule for use in connecting tubes which includes the advantages of the known ferrules with more than one cutting edge but without having their disadvantages.

It is a further object of the present invention to provide a tube joint or a tube fitting with a ferrule requiring little energy during assembly and which indicates to the assembler a distinct and steep increase of resistance when the connection is completely finished.

It is still another object of the present invention to provide a tube joint or a tube fitting with a ferrule which provides the option to the assembler to visually inspect the process of connecting the tube fitting and to control the quality of the assembled connection.

The present invention comprises a tube fitting having a one piece ferrule prior to assembly which ferrule includes front and rear cutting rings. The front ring is cammed into engagement with the tube surface and then is detached, forming in itself, a cam surface for camming the rear ring into the tube surface. Rear ring movement continues until an abutment surface thereon engages the front ring, the consequent rise in assembly torque signalling a completion of assembly to the operator.

The ferrule has an annular groove in its outer wall, said annular groove having a front shoulder and a back shoulder with the front shoulder disposed behind the rear annular cutting edge. The area or zone beneath the back shoulder comprises a purposely weakened part of the annular cross section forming a zone of deformation. To guarantee that the first cutting edge will engage and finish its operation before the rear cutting edge is operative, the latter comprises a bore of a diameter somewhat larger than the diameter of the bore of the front annular cutting edge.

According to a further feature of the invention the front cutting ring of the ferrule extends from the front cutting edge to the rear cutting edge, comprising an outer and an inner surface having walls parallel to each other. With this arrangement the front cutting ring will be used by the rear cutting ring as a sliding surface, being parallel to the inner conical surface of the connecting piece, after the front cutting ring is separated from the ferrule. Preferably, the front cutting ring of the ferrule is designed as a cone of 24 degrees.

In order to achieve separation of the front cutting ring from the ferrule a predetermined breaking zone is provided. This occurs between the circle formed by the intersection of the front shoulder of the outer groove with the intermediate cylindrical surface of the groove and the circle formed from the intersection of the shoulder of the rear cutting edge and the inner annular surface of the front cutting ring.

It is also a feature of the invention to provide a zone at the area of the back shoulder of the intermediate cylindrical surface which can be deformed. According to the invention, the rear annular cutting ring comprises a bore of a first diameter being constant substantially to the area of the back shoulder and then tapering rearwardly to a smaller diameter, which smaller diameter corresponds to the diameter of the bore of the front annular cutting edge.

The method of assembly for tube fittings of the invention consists of the following steps: (a) the ferrule and nut are set up on the end of the tube to be connected and the tube is inserted into engagement with an inner shoulder of the connecting piece, the outer surface of the forwardly converging conical front ring thereby abutting against the inner conical surface of the connecting piece; (b) the pressure member or nut is then screwed onto the connecting piece with a steady increasing torque until the ferrule breaks and the applied torque considerably decreases; and (c) the pressure member is tightened further with increasing torque until the former front shoulder of the annular groove abuts against the back shoulder of the annular groove, and the torque steeply increases, therewith indicating that the assembly is completed.

DESCRIPTION OF THE PREFERRED EMBODIMENT

Figure 1:
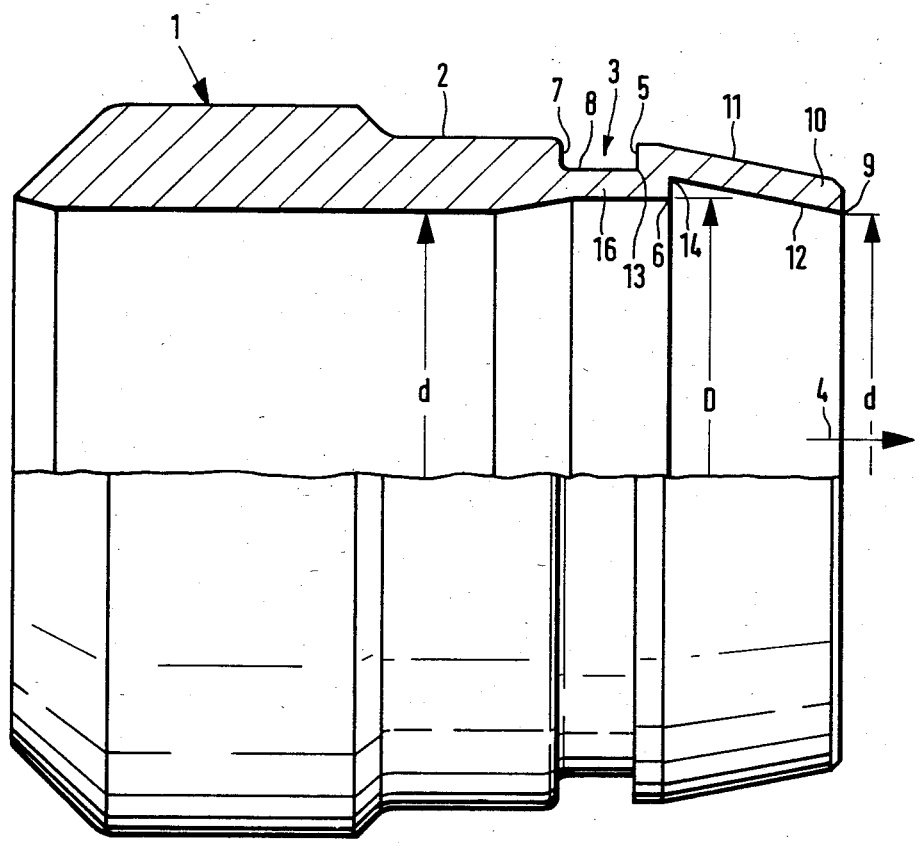
FIG. 1 is an elevational view of the ferrule according to the invention in its initial condition with the upper half shown in cross section.

As shown in FIG. 1 the ferrule 1 is drawn in an enlarged scale and in its initial condition. The ferrule 1 comprises generally a tubular body member having a reduced portion 2 and provided with an annular groove 3 at its outer wall. The front shoulder 5 of groove 3, in the direction of movement during assembly, as depicted by arrow 4, is disposed behind a rear annular cutting edge 6 on the inside of ferrule 1. The general area beneath the back shoulder 7 of the groove 3 comprises a purposely weakened part of the annular cross section of ferrule 1, forming a zone of deformation, the function of which will be explained below. The intermediate cylindrical portion 8 of the annular groove 3 can be provided with a radius or as shown with a straight base wall. Ferrule 1 further comprises integral front cutting ring 10 of conical configuration having front cutting edge 9 and rear cutting ring 16 of generally cylindrical configuration having rear cutting edge 6. The rear annular cutting edge 6 comprises a bore of a diameter D somewhat larger than the diameter d of the bore of the front annular cutting edge 9. This feature guarantees that front cutting edge 9 will be provided with the necessary angle of cutting and will cut first into the wall of the tube (not shown in FIG. 1) by pushing up material of the wall. The front cutting ring 10 of the ferrule 1 therefore is preferably designed as a of cone of 24 degrees with respect to the axis of ferrule 1.

A predetermined breaking or shear zone is formed in the area defined between circle 13, resulting from the intersection of front shoulder 5 with the intermediate cylindrical portion 8 and circle 14, resulting from the intersection of the front shoulder of the cutting ring 16 forming cutting edge 6 and the inner annular surface 12 of the front cutting ring 10.

Front cutting ring 10 extends from front cutting edge 9 to rear cutting edge 6, comprising an outer surface 11 and an inner surface 12 with the surfaces parallel to each other. When the predetermined breaking zone is broken during the assembly operation rear cutting ring 16 uses the inner annular surface 12 of the now separated front cutting ring 10 as a sliding surface for guiding rear cutting ring 16 into engagement with the tube surface.

Although, initially, the complete surface of the ferrule 1 is tempered, the soft fractured surface between circles 13, 14 is able to slide along on the inner annular surface 12 of front cutting ring 10 without tilting, evenly forcing rear cutting edge 6 into the wall of the tube at a predefined angle of preferably 24 degrees, by pushing up material of the tube.

During this sliding operation the forward portion of rear cutting ring 16 is formed preferably into the 24 degree cone defined by the inner surface 12 of the cutting ring 10. To facilitate this deformation, the diameter D of the bore forming cutting edge 6 steadily decreases from the location generally beneath the back shoulder 7 in backward direction (against the direction of arrow 4) down to diameter d, which corresponds to the diameter d of the bore of front cutting edge 9. With this arrangement, at the area of the back shoulder 7 a joint or hingelike function is provided by the deformable structure so that the rear cutting ring 16 also cuts into the wall of the tube at a definite angle after the front cutting ring 10 has already completed its cutting operation.

Figure 2:
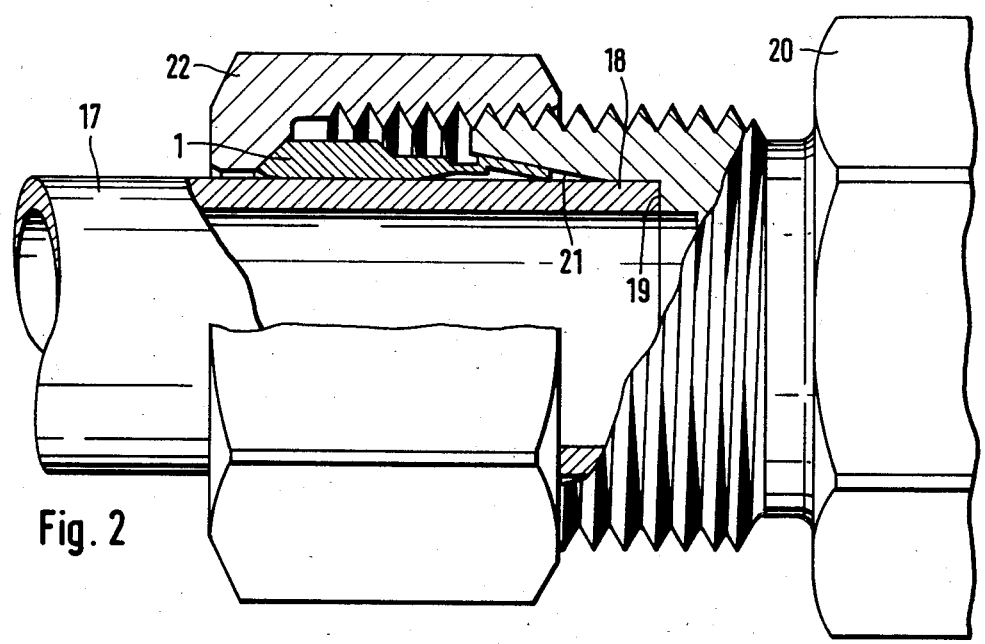
FIGS. 2-5 are elevational views of the tube joint of the invention in different phases of connection, each view being partly in cross section.

The tube joint and method of assembling the tube fitting is described with reference to the FIGS. 2-5. The tube 17 to be connected, on which end 18 the ferrule 1 has been set up before, will be inserted up to the inner shoulder 19 of the connecting piece or coupling body 20, the outer surface 11 of the front cutting ring 10 thereby abutting against an inner conical surface 21 of the connecting piece 20. FIG. 2 shows this first phase of the assembly method. The diameter of tube 17 is approximately the same as or slightly smaller than the diameter d of ferrule 1.

Figure 3:
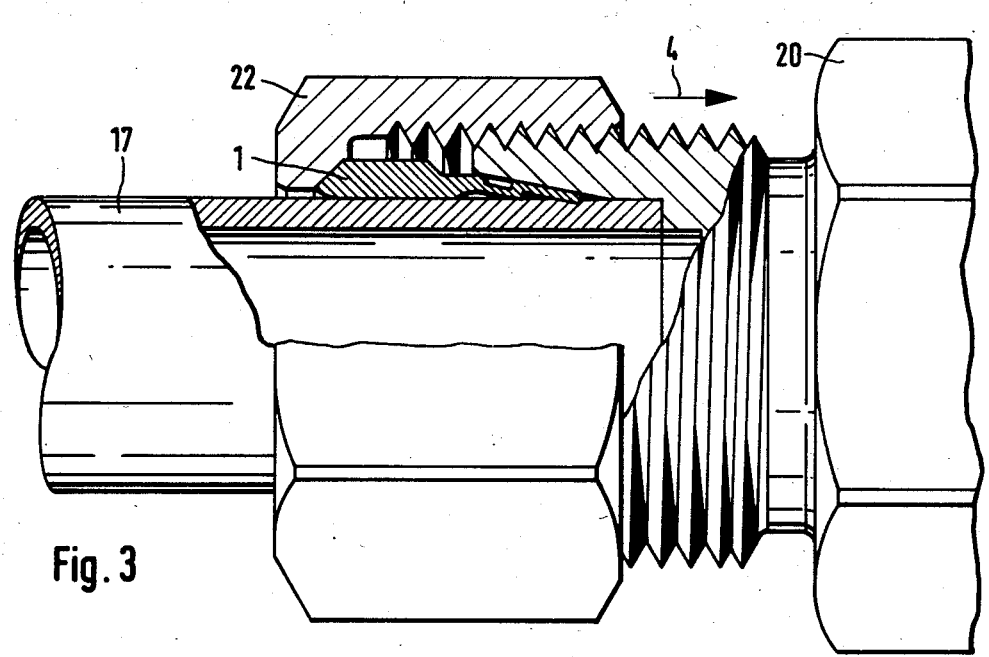

The coupling nut 22 formed as a pressure member, which also has been set up from the end 19 of the tube 17 or from the other side of the tube 17, is screwed with the connecting piece 20 by a steadily increasing torque, the cutting edge 9 of the front cutting ring 10 thereby cutting into the wall of the tube 17. This second phase of assembly method is shown in FIG. 3.

After having sufficiently cut into the wall of tube 17 by the front cutting edge 9, with further screwing down of coupling nut 22 the applied torque moment decreases evidently. With this it is distinctly indicated to the assembler, that the predetermined breaking zone between circles 13, 14, is broken, that front and rear cutting rings 10, 16 have separated and that the front cutting ring 10 has completed its cutting operation.

Figure 4:
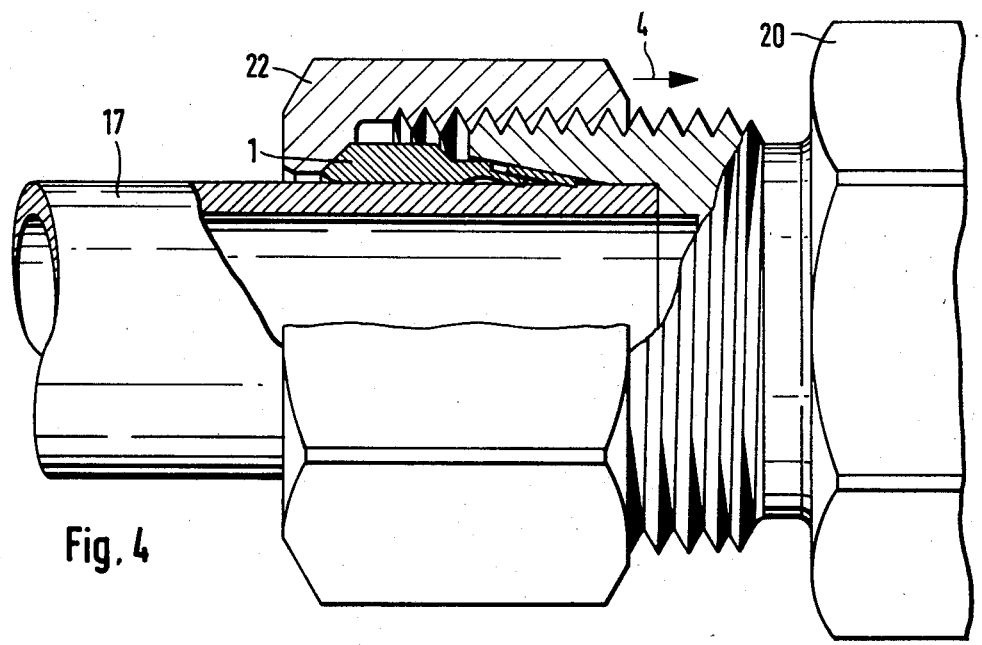

The relatively soft surface of the sheared area of the rear ring 16 which now has been formed is moved into engagement and under the inner surface 12 of front cutting ring 10 when the coupling nut 22 is continued to be screwed down, and the forward portion of ring 16 will be pushed parallel to the cone of ring 10 at the angle of 24 degrees. Rear cutting edge 6 will engage the surface of tube 17 at a predetermined spacing from the point of engagement of front cutting edge 9, as shown by FIG. 4.

Figure 5:
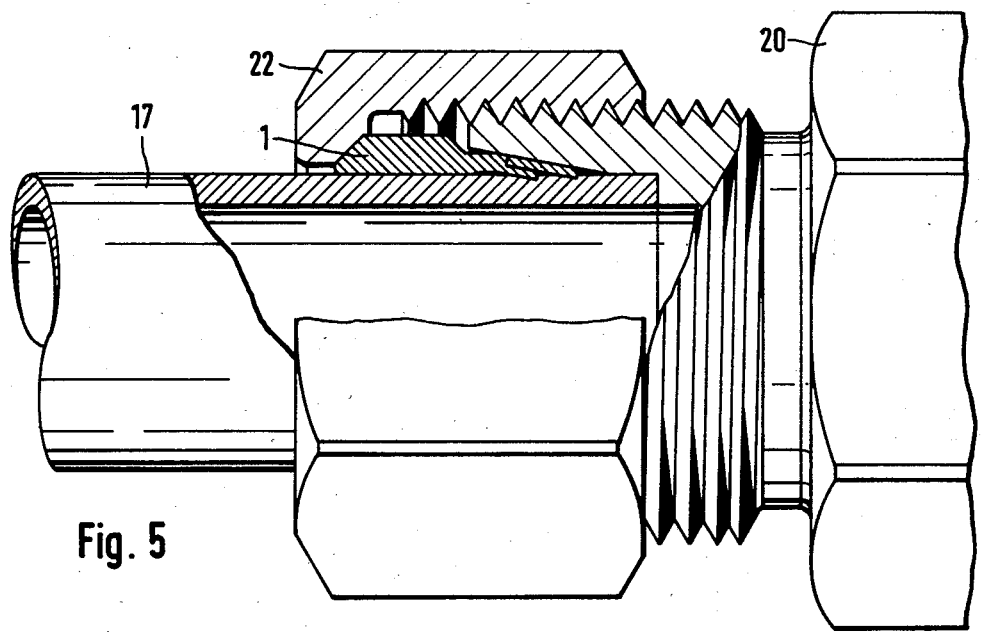

The torque applied by the assembler via coupling nut 22 increases nearly the same as with the cutting operation of the front cutting ring 10. The front shoulder 5 of the front cutting ring 10 has assumed a fixed position at this juncture due to the completed cutting operation of the front ring 10. Back shoulder 7 moves with rear ring 16 into engagement with front shoulder 5, and when this position is reached, the torque applied by the assembler through coupling nut 22 steeply increases and signals an end to the assembly. Throughout this movement, cutting edge 6 of the rear cutting ring 16 has completely finished its cutting operation by cutting into and piling up material on the surface of tube 17. This state of assembly is shown in FIG. 5.

The ferrule of this invention shows a great number of advantages over prior art structures. By the predetermined breaking zone several problems will be settled. The cutting operation of the rear cutting edge 6 basically can only begin if the cutting operation of the front cutting ring 10 is completely finished.

This operation is indicated distinctly to the assembler by the considerable decrease of applied torque. The cutting operations therefore take place in a predetermined manner and sequentially one after another, therewith providing the great advantage that the forces needed over the assembly interval are not overlapping so that less effort is required.

The predetermined breaking zone together with the flexible or deformable construction of the rear cutting ring 16 allows the rear cutting ring 16 to be turned along a defined cone during the further assembly operation for setting the rear cutting edge 6 into the wall of the tube 17. The soft fractured surface of the rear cutting ring 16 slides along the tempered inner surface of the front cutting ring 10, thereby preventing tilting of the rear ring 16. Rear cutting ring 16 thereby also receives a defined angle of cutting ensuring preferring cutting and excluding scraping along the wall of tube 17.

Completion of assembly will be distinctly indicated to the assembler because the shoulders 5, 7 of the annular groove 3 are acting as limiting stops resulting in a steeply increasing resistance when the shoulders abut against each other. Preferably, shoulders 5, 7 are initially disposed in parallel radial planes, as are the shoulders forming cutting edges 6, 9. The condition of the assembly can be checked visually by unscrewing the coupling nut 22. This becomes evident by comparing FIG. 4 with FIG. 5. As shown in FIG. 4, shoulders 5, 7 are not yet in contact with each other so that a noticeable gap indicates that the assembly operation is not yet completed. As shown by FIG. 5, shoulders 5, 7 abut each other, and it can thus be seen that the assembly operation is completed.

When releasing the coupling nut 22 the cutting rings 10, 16 are slightly unsprung, but remain generally in their end positions engraved or cut into the wall of tube 17 and by tightening the coupling nut 22 again the rings 10, 16 will be pressed once more into their sealed end positions. In such repeated assembly operation the end of the operation will again be indicated. Even if the rings 10, 16 have turned in relation to each other after the coupling nut 22 has been released the applied normal force will be sufficient at the repeated operation to guarantee a tight connection. Furthermore, radially directed forces will be absorbed to some extent by the rear ring 16 because this rear ring 16 is acting as a tempered cone serving as a lining of the conical inner surface 21 of the connecting piece 20. Preferably outer surface 2 of ferrule 1, just rearwardly of back shoulder 7, engages inner surface 21 of connecting piece 20 which may assist as well in deformation of the forward end of rear cutting ring 16 into the conical configuration. In the assembled arrangement there is a strengthened condition provided in the overlapping and radially stacked relation of front ring 10, rear ring 16 and the threaded portions of connecting piece 20 and nut 22, as seen in the completed position described in FIG. 5.

Preferably also the rearward end of ferrule 1 is of conical configuration and mates with an inner conical surface on coupling nut 22, to urge ferrule 1 not only axially along tube 17, but also radially into engagement therewith at the rearward end, thereby establishing forces upon either end of ferrule 1. Since the central portion of ferrule 1 is out of contact with the inner surface of nut 22, a tendency toward bowing or a springlike curvature is imparted to ferrule 1 to enhance the sealing and gripping effect at cutting edges 6, 9.

I claim:
1. A tube fitting, comprising
   a connecting piece having an inner conical surface,
   a coupling nut threaded to said connecting piece,
   a one-piece ferrule disposed between said connecting piece and said nut and adapted for deformation into engagement with a tube upon relative axial closing movement of said connecting piece and said nut,
   said ferrule, comprising
   a generally cylindrical body member having a bore and an outer wall,
   a frusto-conical front cutting ring at one end of said body member engageable with said inner conical surface of said connecting piece, said front cutting ring having a front cutting edge of one diameter at the forward portion thereof,
   a rear cutting ring connecting said body member and said front cutting ring, said rear cutting having a rear cutting edge at the forward portion thereof of a diameter greater than the diameter of said front cutting edge and said body member bore, and
   an annular groove in said outer wall of said ferrule, said groove having a front shoulder, back shoulder and a cylindrical intermediate surface forming a part of said rear cutting ring, said front shoulder being disposed rearwardly of said rear cutting edge to provide a shear section therebetween and between said first and second cutting rings, said front cutting ring comprising substantially parallel inner and outer frusto-conical wall surfaces extending axially substantially from said front cutting edge to said rear cutting edge,
   said rear cutting ring having an inner surface formed of a frusto-conical surface extending forwardly and outwardly from said body member bore and a cylindrical surface extending forwardly from said frusto-conical surface and terminating in said rear cutting edge, said rear cutting ring being thinner than said body member and adapted to be sheared from said front cutting ring upon makeup of said fitting and to be deformed so that said intermediate surface of said groove is in a substantially frusto-conical configuration closely adjacent and substantially fully nested beneath said front cutting ring.

2. A tube fitting as set forth in claim 1 wherein said inner and outer wall surfaces are disposed at an angle of 24 degrees relative to said fitting axis.

3. A tube fitting as set forth in claim 1 wherein said shear section between said front and rear cutting rings is defined by the annular intersection of said front shoulder and said intermediate surface and the annular intersection of a shoulder forming said rear cutting ring and said inner wall surface of said front cutting ring.

4. A tube fitting joint, comprising a tube, a connecting piece, a coupling nut and a ferrule,
   said connecting piece having an inner conical surface and a stop shoulder, said coupling nut threadedly engaged with said connecting piece for axially moving said ferrule against said inner conical surface into engagement with the surface of said tube, said tube being in engagement with said stop shoulder,
   said ferrule comprising separated front and rear cutting rings stacked in overlapping relation in engagement with said tube surface and disposed between said inner conical surface of said connecting piece and said tube, said ferrule initially being an integral structure comprising a body member having a bore therein, said rear cutting ring being disposed at the forward end of said body member and said front cutting ring being disposed at the forward end of said rear cutting ring, a groove in the outer surface of said ferrule having front and back shoulders and a cylindrical surface therebetween forming a part of said rear cutting ring, each of said cutting rings having a cutting edge at the forward portion thereof, said front cutting ring comprising inner and outer substantially parallel frusto-conical surfaces extending rearwardly from said front cutting edge to said rear cutting edge, said rear cutting ring having an inner surface consisting of a frusto-conical surface extending forwardly of said body member and a cylindrical surface terminating in said rear cutting edge, said rear cutting edge being of a diameter greater than that of said body member bore, said front cutting ring engaging said inner conical surface of said connecting piece upon axial closure of said connecting piece and said coupling nut with said front cutting edge in biting engagement with said tube, said rear cutting ring being separated from said front cutting ring with said rear cutting edge in biting engagement with said tube rearwardly of said front cutting edge, said cylindrical surface of said groove being deformed into a frusto-conical surface closely adjacent and substantially fully nested beneath said front cutting ring, said front and back shoulders of said groove being in engagement to signal completed makeup of said fitting.

* * * * *